(12) United States Patent
Liang et al.

(10) Patent No.: US 7,433,657 B2
(45) Date of Patent: Oct. 7, 2008

(54) APPARATUS AND METHOD FOR DYNAMICALLY CLOCKING A LOOP FILTER IN A DIGITAL COMMUNICATIONS DEVICE

(75) Inventors: Paul Cheng-Po Liang, Santa Clara, CA (US); Rajesh D. Patel, Campbell, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 536 days.

(21) Appl. No.: 11/268,798

(22) Filed: Nov. 8, 2005

(65) Prior Publication Data

US 2007/0104289 A1   May 10, 2007

(51) Int. Cl.
*H04B 1/16* (2006.01)
(52) U.S. Cl. ............... 455/119; 455/182.2; 455/180.3; 455/192.2; 375/344
(58) Field of Classification Search ........... 455/119, 455/180.3, 182.2, 192.2, 205, 208, 260, 264, 455/318, 323, 179.1, 180.1, 180.2; 375/344
See application file for complete search history.

(56) References Cited

U.S. PATENT DOCUMENTS 4,489,413 A * 12/1984 Richmond et al. .......... 370/278
5,982,242 A * 11/1999 Jun et al. .................... 331/49
6,704,554 B1 * 3/2004 Gerrits ....................... 455/205

* cited by examiner

*Primary Examiner*—Tony T Nguyen
(74) *Attorney, Agent, or Firm*—McDermott Will & Emery LLP

(57) ABSTRACT

A transmitter has a signal generator, an amplifier, a detection circuit, a comparison circuit, a loop filter, and an adjustable clock. The signal generator produces a signal. The signal is produced with a first frequency characteristic and contains frequency-related information. The detection circuit detects the first frequency-related characteristic and generates an associated signal in response. A comparison circuit compares the signal from the detection circuit and another signal. It outputs a signal associated with the difference between the two. A loop filter receives the output of the comparison circuit and generates a signal to the signal generator in. The loop filter is clocked at a second frequency by a signal from a clock circuit. The clock circuit can compare the first frequency and the second frequency, and can change the second frequency based upon a relationship between the two frequencies.

5 Claims, 3 Drawing Sheets

APPARATUS AND METHOD FOR DYNAMICALLY CLOCKING A LOOP FILTER IN A DIGITAL COMMUNICATIONS DEVICE

FIELD

The current application is directed to digital wireless communications. In particular, this application is directed to reducing noise effects related to digital communications.

BACKGROUND

In some communications systems, digital components are used to create the outgoing signal or to deconstruct the incoming signal. This allows the system to perform its function cheaper and with a more efficient use of power. Further, the use of digital components allows the vagaries of analog components to be discarded. Thus, the further use of digital components allows communications to be performed with lower cost and/or lower component counts than used in wholly analog systems, and without huge amounts of analog expertise required.

In some cases, a signal having certain phase or frequency characteristics can be input into a driver stage to be amplified. This is the case in frequency modulation, as well as that employed in combined amplitude modulation/phase modulation systems. In these cases, the conventional systems typically transform the digital signal into an analog signal by outputting the digital data (or derivation thereof) an output of a voltage controlled oscillator (VCO). In this method, the output of the system is then tested against a reference, and the error signal is applied to a loop filter which produces an appropriate correction signal for the system. In this case, control apparatus is usually accomplished with a phase lock loop or a frequency control loop.

However, the signal to noise ratio (SNR) of the system will fall drastically when the clocking speed of the loop filter (or other digital component that drives the VCO) is an integer divisor of the output signal. Thus, when the system operates at output rates that are harmonics or sub-harmonics of the clocking rate of the driver mechanism in a phase lock loop or frequency control loop, that operation can be problematic in a typical communication system. The most pronounced effects on the output of such a system is a frequency that is an integer multiple of the output frequency. In this case, this mode of operation leads to SNR (or other indication of noise) indicating much greater adverse operating characteristics than at the other sub-harmonics.

BRIEF DESCRIPTION

In this description, a communications transmitter is envisioned. The transmitter comprises a signal generator with an input. The signal generator is operable to produce a first signal at a first frequency, with the first signal having an associated first frequency characteristic. The first signal contains frequency-related information and is produced in accordance with a signal received at the input of the signal generator.

An amplification stage is coupled to the signal generator and has an output. The amplification stage is operable to receive the output of the signal generator. The output of the amplification stage is dependant on both the first signal and an incoming amplitude modulating signal.

A detection circuit is coupled to the output of the signal generator. The detection circuit has an output and is operable to detect the first frequency-related characteristic of the output of the signal generator. The detection circuit can generate a signal representative of the first frequency-related characteristic. A comparison circuit is coupled to the detection circuit and has an output. It is operable to compare the signal representative of the first frequency-related characteristic and a signal representative of a second frequency-related characteristic. The output of the comparison circuit is indicative of a difference between the first frequency-related characteristic and the second frequency-related characteristic.

A loop filter is coupled to the comparison circuit and to the signal generator. It is operable to output a signal to the signal generator in response to the output of the comparison circuit, and is operable to be clocked by an input clock at a second frequency. The output of the loop filter provides the input to the signal generator. A clock circuit is coupled to the comparison circuit and to the loop filter, and is used for providing the input clock to the loop filter. The clock circuit is operable to compare the first frequency and the second frequency. The clock circuit can change the second frequency based upon a relationship between the first frequency and the second frequency.

In another aspect, a circuit for producing an output signal based upon an input signal is envisioned. The output signal has an output frequency and an associated output frequency characteristic, and contains frequency-related and amplitude information. The output signal is output to an output port. The input signal is received from an input port and is representative of an expected output frequency characteristic. The circuit comprises a detection circuit for producing a first signal indicative of the output frequency characteristic. A comparison circuit is provided and is coupled to the detection circuit and to the input port. The comparison circuit compares the frequency characteristic as denoted by the first signal and the expected output frequency characteristic, and produces a second signal indicative of a difference between the output frequency characteristic and the expected output frequency characteristic.

A loop filter is coupled to the comparison circuit and outputs a third signal in response to the second signal. The loop filter is operated at least in part by a clock signal operating at a clock frequency. A signal generator is coupled to the loop filter and to the detection circuit. In response to the third signal, the signal generator produces a signal having the output frequency characteristic. An amplification circuit is coupled to the signal generator and to an amplitude modulation circuit. The amplification circuit produces the output signal. The output of the amplification circuit is dependant on both the signal from the signal generator and the signal from the amplitude modulation circuit. In response, it outputs the output signal. A clock circuit is coupled to the loop filter and can produce the clock signal. The clock circuit can dynamically change the clock frequency based upon a comparison of an integer multiple of the clock frequency and the output frequency.

In another aspect, a transmitter is envisioned. The transmitter has an amplifier for producing a signal modulated with both an output amplitude characteristic and an output frequency characteristic. A first circuit is coupled to the amplifier and controls the output frequency characteristic. The first circuit has a clock circuit and a filter coupled to the clock circuit. The filter is actuated by a clock signal with a clock frequency, the clock signal being produced by the clock circuit. A signal generator is coupled to the filter and produces a signal having the output frequency characteristic. The clock frequency is dynamically determined based upon a frequency characteristic associated with the clock signal and the output frequency characteristic.

A method of controlling a transmitter is also envisioned. The transmitter has digital components controlling the generation of an output signal having an output frequency. The digital components are clocked at a first frequency, where the first frequency is derived from a base frequency and a first multiple. The method includes: measuring the output frequency; determining a second frequency such that the second frequency is an integer multiple of the first frequency; determining if the second frequency is within a range about the output frequency; and based on the act of determining, selectively deriving a new first frequency by changing the first multiple to a new multiple, wherein an integer multiple of the new first frequency falls outside the range about the output frequency.

An apparatus for controlling a transmitter is also envisioned. The transmitter has digital components controlling the generation of an output signal having an output frequency. The digital components are clocked at a first frequency, where the first frequency is derived from a base frequency and a first multiplier.

The apparatus has a means for measuring the output frequency and a means for determining a second frequency, where the second frequency is an integer multiple of the first frequency. A means for determining if the second frequency lies within a range about the output frequency is also included. A means for selectively changing the first frequency to a new first frequency is present. The selective change is accomplished by changing the first multiplier to a second multiplier. The means for selectively changing is actuated by an output of the means for determining if the second frequency lies within a range. If a change is called for, an integer multiple of the new first frequency lies outside the range about the output frequency.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

DETAILED DESCRIPTION

Embodiments of the present invention are described herein in the context of an apparatus and method for dynamically clocking a loop filter in a communications device. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of digital systems, including hardware, software, or any combination thereof. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

Figure 1:
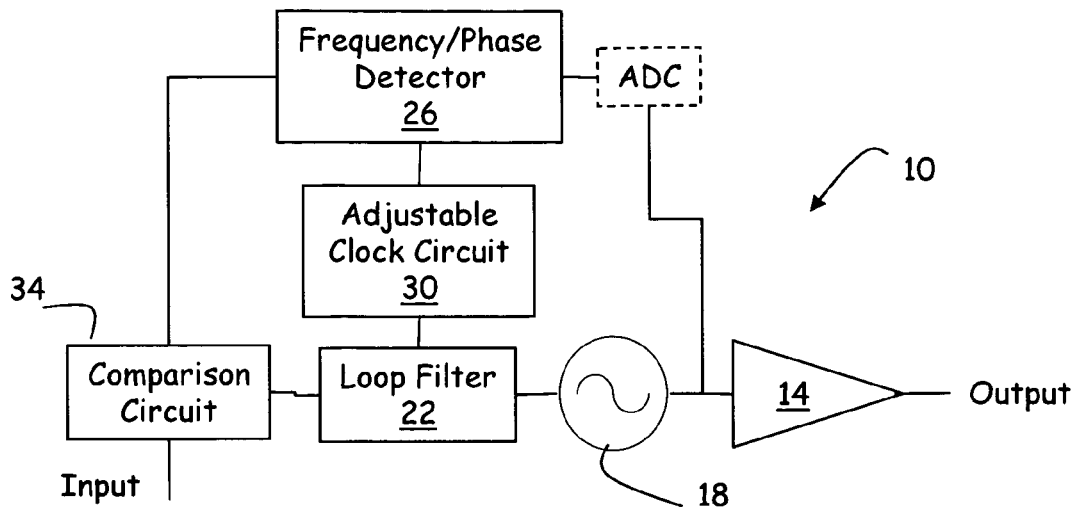
FIG. 1 is a schematic block diagram of a transmitter employing a dynamically clocked loop filter.

FIG. 1 is a schematic block diagram of a transmitter employing a dynamically clocked loop filter. A communications transmitter 10 outputs a transmitted signal from an amplifier 14. The amplifier 14 accepts as an input signal from a signal generator having certain phase or a frequency characteristic, such as that provided by a voltage controlled oscillator (VCO) 18. One will note that many signal generators are able to be implemented, and the VCO is not necessarily unique in accomplishing the task of signal generation for the purposes of this disclosure. This disclosure should be read as inclusive of other apparatuses that produce a signal having frequency, phase, or other frequency characteristic.

The output of the VCO 18 is dependant upon an output of driver mechanism, such as a loop filter 22. The loop filter 22 accepts as an input a signal representing an error between a desired signal and an actual output signal. Based upon the value of this error signal, the loop filter provides a signal to the VCO 18 to output a higher or lower specific frequency, depending on the circumstances.

In the following discussion, the operation of the system is described in terms of frequency. However, operation based upon general frequency characteristics (including frequency, phase, and other angle-information) may be implemented in a similar manner. Those components described with relation to frequency may also be implemented with phase characteristics, phase derivatives, and the like. Accordingly, this disclosure should be read as contemplating those implementations as well as those specifically and explicitly described. In terms of this disclosure, the frequency, phase, or phase differentials may be measured and compensated for, and this disclosure should be read to encompass such frequency related characteristics.

An output of the VCO 18 is directed to a phase and/or frequency detector 26. An optional analog to digital converter (ADC) 30 is interposed to convert an analog signal to digital format for the frequency detection circuit 26. In another embodiment, the frequency detection circuit may directly test an analog signal and output a signal representative of the output of the VCO 18. The frequency detection circuit may also be embodied as a phase detection circuit.

The output of the frequency detection circuit 26 and a desired signal are compared with one another in a comparison circuit 34. In turn, the comparison of these signals produce an error signal that is input into the loop filter 22.

In this manner, the amplifier 14 is driven by the phase lock loop comprising the VCO 18, the loop filter 22, the frequency detector 26, and the comparison circuit 34. The previous output of the transmitter is then compared to the signal that is wished, and an error signal is generated. The loop filter 22 then produces a signal indicative of an error between the output signal and the wished-for incoming signal. The signal generated by the loop filter 22 drives the VCO 18 to match the input signal. The operation of the loop depicted in FIG. 1 may be one applied not just to frequency matching techniques, but, as indicated supra, to matching frequency-related characteristics techniques as well, and this disclosure should be read as encompassing those as well.

However, digital sampling techniques used by the loop filter 22 may lead to performance shortcomings of the transmitter 10 when operating at certain points. In particular, problems could are prevalent when the operating frequency of the transmitter is at or near integer multiples of the clocking frequency of the loop filter 22.

Assume that the VCO 18 outputs a signal with a frequency $F_N$. If the loop filter 22 samples at a frequency $F_L$, and the final output of the VCO 18 is or is close to an integer multiple of frequency $F_L$ (i.e. $F_N = kF_L$, where k is an integer), the signal to noise ratio of the final output may be far less than optimum, as indicated supra and described infra. In these cases of a final output at or near integer multiples of frequency $F_L$ may lead to bad signal to noise ratios (SNR) at the final transmitted output due to the sampling characteristics.

Figure 2:
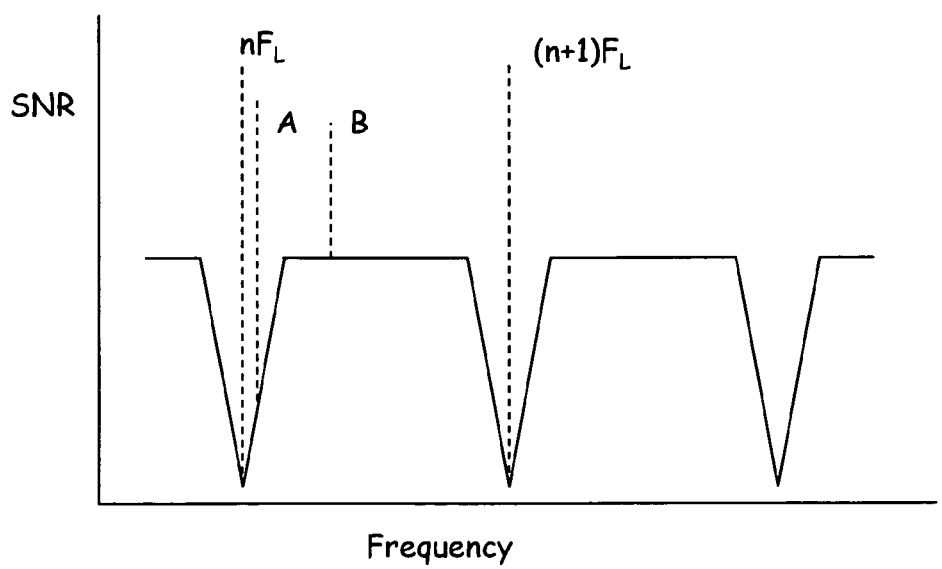
FIG. 2 is a plot detailing typical SNR results of a transmitter operation across a range of frequencies.

FIG. 2 is a plot detailing typical SNR results of a transmitter operation across a range of frequencies. FIG. 2a shows spikes in the SNR of an output system at various frequencies. As can be seen from the graph, a large decrease in the SNR of the system occurs at integer multiples of the clocking frequency of the loop filter or other loop mechanism. Other portions of the spectrum where SNR is degraded can also occur at multiples of integer reciprocals of the loop clocking frequency $F_L$ (i.e. $F_L/2$, $F_L/3$, $F_L/4$, . . . . ) However, these degradations in SNR are not as severe as those seen at the integer multiples, and are not included in this discussion.

In the operation of a wireless communication device, the operation frequency of the output may be at one of several frequencies within a specified spectrum. For example, the GSM operation mode has channel offsets every 200 kilohertz (kHz). Accordingly, depending upon the operation of the base station, the mobile wireless unit may in fact be tasked with operating at a sub-optimum operation point, such as that denoted by point A in FIG. 2. Thus, when the transmitter's operation is somehow specified to at the frequency denoted by point A, the user of the mobile wireless unit will experience problems in the operation and/or communications using such wireless communications device. The same device operating at point B will encounter much better operation, since point B is a frequency where the noise problems associated with sampling rates will not occur.

It should be noted that the operating (i.e. output) frequency can be set by many different means. The way in which the operating frequency is set is not relevant for the purposes of this disclosure.

Turning back to FIG. 1, the wireless communications device 10 has an adjustable clock circuit 30. The adjustable clock circuit 30 is operable to accept a signal representative of the operating frequency of the output, such as that delivered by the frequency detection circuit 26. The adjustable clock circuit 30 is operable to accept such a signal indicative of the frequency of the output signal, and to determine whether to alter the sampling frequency of the loop filter 22.

Accordingly, when the communications device 10 determines that the operating frequency of the output and an integer multiple of the clock frequency of the loop filter are too close together, where that the SNR of the output would be degraded (i.e. point A of FIG. 2), the adjustable clock circuit 30 can alter the clocking frequency of the loop filter 22. Such a change in the clock frequency in turn changes the SNR characteristics of the communications device 10. In practice, the change to the SNR characteristics enables the communications device to operate at the same frequency as before but avoid the SNR problems associated with the previous output.

Figure 3:
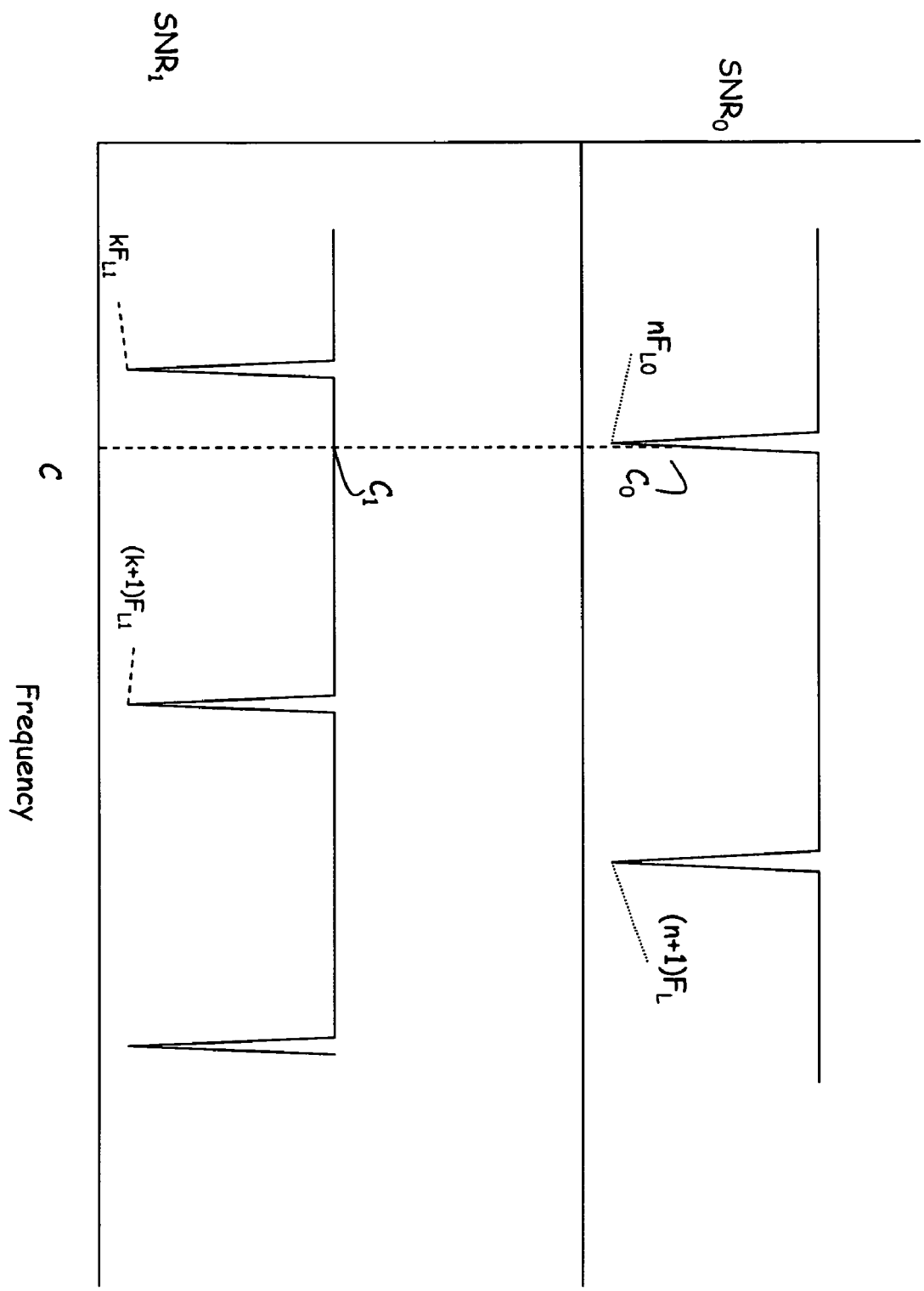
FIG. 3 is a frequency diagram of a signal to noise ratio of a signal generated by the transmitter of FIG. 1.

FIG. 3 is a frequency diagram of a signal to noise ratio of a signal generated by the transmitter of FIG. 1. This diagram highlights the ability of the present disclosure to change the operational characteristics of the output without any change in frequency.

In FIG. 3, assume that the operating frequency for the output is a frequency C, and the initial operating point of the system has a signal to noise ratio (SNR) profile of that in the upper graph of FIG. 3 denoted $SNR_0$. At that frequency, the system is operating at point $C_0$, which is characterized by a low SNR indicating substantial noise associated with that operation point. At frequency C, it should be noted that the sampling characteristics of the loop leads to such a degradation of the performance due to the proximity of frequency C to an integer multiple of the clocking frequency for the loop filter.

In response to the device operating at point $C_0$, a transmitter, such as that depicted in FIG. 1, can determine the operating frequency of the output. If the operating point of the system is at a point that will is associated with less than a predetermined magnitude of signal to noise ratio, or within a predetermined frequency difference from the center frequency of an integer multiple of the clock associated with the loop filter, the transmitter can dynamically change the operating characteristics of the system to compensate for this. In this case, the transmitter alters the operating frequency of the loop filter. Accordingly, the SNR function changes due to the new clock frequency, as denoted by the lower graph in FIG. 3 ($SNR_1$.) The frequencies where minimum signal to noise ratio events occur are shifted to integer values of the new clock frequency of the loop filter. Additionally, the width between minima SNR events are either stretched or compacted, depending upon whether the clock rate of the loop filter has increased or decreased, respectively.

In this case, the transmitter has shifted the base clock frequency, thereby shifting the minimal SNR events away from the operating frequency point C. Accordingly, this allows the transmitter to operate in a much more efficient manner at the point on $SNR_1$ denoted as $C_1$. This change can be effected without changing the output of the transmitter.

With reference to FIG. 1, this is can be operationally performed by the adjustable clock 30. In FIG. 1, the adjustable clock circuit 30 changes the clocking of the loop filter 22, thus changing the SNR characteristics of the transmitter. To effectuate the change, the adjustable clock circuit can change the operating frequency of the loop filter 22 directly, or can initiate a change in the clocking frequency through changing a selectable multiple.

In one case, the output of the VCO 18 is detected by the frequency detection circuit 26 and converted into a format that can be compared with the input signal. An output of the frequency detection circuit 26 is coupled to an input of the adjustable clock circuit 30. The adjustable clock circuit 30 can determine whether the operational parameters of the current output frequency are sufficient to change the clocking frequency of the loop filter 22.

As noted before, the determination of when to change the frequency, either through a direct change or through a change of multipliers, can be determined a variety of ways. In one case, a lookup table can be supplied to the system. The operational frequency of the incoming or outgoing signal can then be determined. If the determined frequency lies within a predetermined range from the loop filter clock, or if the decrease in the SNR based upon this effect is within a predetermined range, the system can change the loop filter clock.

In one case, the determination to change the clock frequency may be made based on an absolute difference between the multiple of the clock frequency and the operational frequency. In this case, assume an operational frequency Fz and the clock frequency is Fc. If $|Fz-nFc|<=X$, the system will implement a clock change. In another cases, the decision may be made based upon a percentage of Fc, or some other function of either Fc or Fz.

In yet another case, the function of the SNR profile will be known, and the determination can be made based upon the value of the SNR profile at the operational frequency. Letting S(Fc) be the SNR profile of the system at the operational frequency Fc, and N(S(Fc), Fz) is the value of the S(Fc) profile at Fz, the decision to switch can be made on this value. For example if N(S(Fc), Fz)<X, then a decision can be made to switch the clock frequency. Other functional values associated with the inverse of the SNR profile can be implemented as well.

In one case, the operational frequencies of the underlying communications mode are known, and the distances between the frequency channels are also known. In this case, a clock frequency can impact at multiple channels. Accordingly, a lookup table can be implemented to tell which clock frequencies should be used with the various channels.

In this manner, a number of relationships can be established between the clocking of the loop filter and the noise in the output. Thus, the system can detect whether such a relationship is present (i.e. noise level, SNR, or relationship between the clocking frequency and the output frequency) and dynamically modify the clocking behavior of the loop filter.

Figure 4:
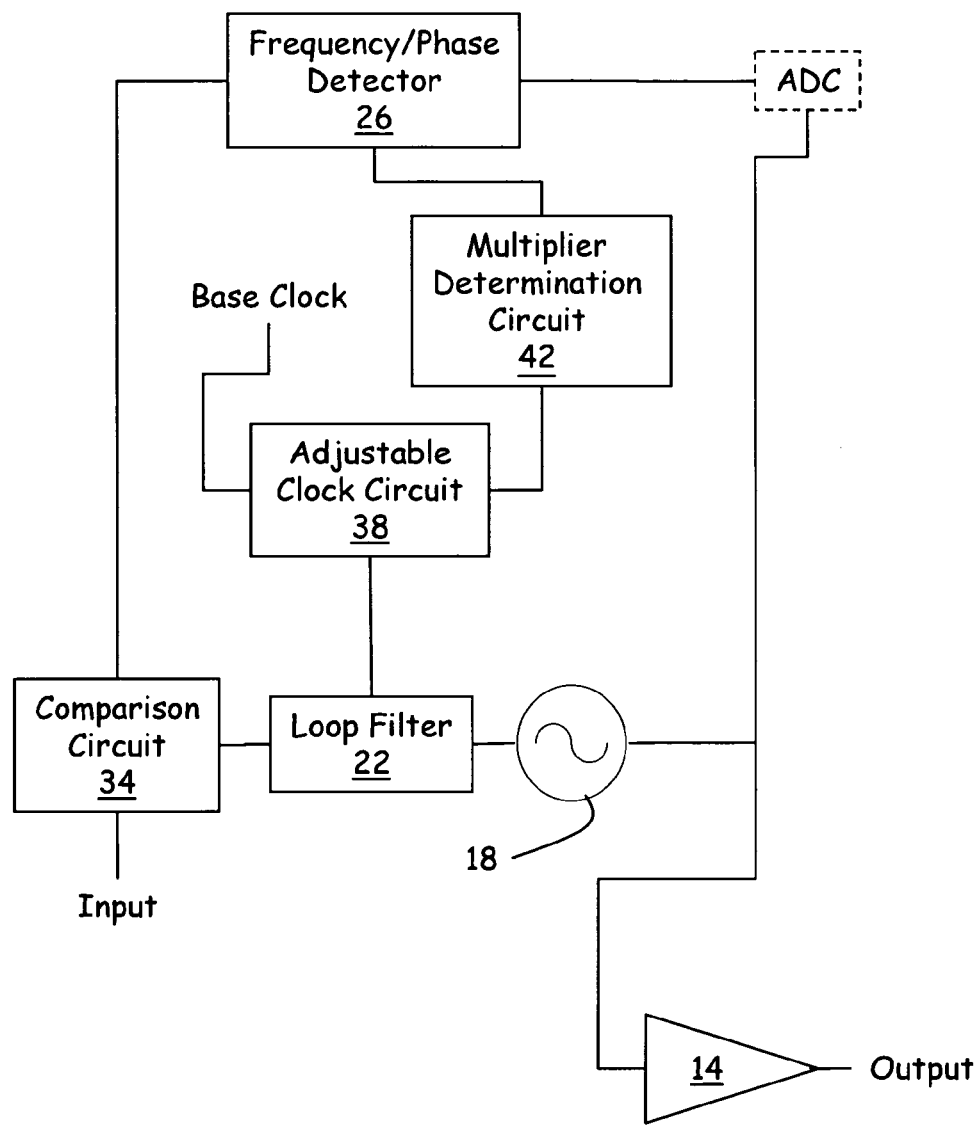
FIG. 4 is a schematic block diagram of an alternative embodiment of an adjustable clock circuit that is operable to switch amongst a plurality of multipliers to clock the loop filter.

FIG. 4 is a schematic block diagram of an alternative embodiment of a dynamically clocked loop filter in communications device. In this case, the adjustable clock circuit is operable to switch amongst a plurality of multipliers that it can use to clock the loop filter 22. A base clock is input into an adjustable clock circuit 38. The detection circuit produces a signal indicative of the frequency at which the VCO is operating. This signal is input into a multiplier determination circuit 42, which relays to the adjustable clock circuit 38 the base frequency multiplier, or an indication to change the base frequency multiplier. The adjustable clock circuit 38 can, based upon the base clock and the multiplier, produce the loop filter clock. It should be said that the multiplier of the base frequency used to produce the loop filter clock may be an integer, but it could also be any non-integer as well.

If the operation of the system is determined so that the operating frequency (or frequency characteristic) of the system will lead to high noise (based upon the relationship of the clocking rate of the loop filter and the operation point), the adjustable clock circuit can change the clocking of the loop filter in order to reduce the noise effects due to the clocking of the loop filter. In this manner the system can detect whether the transmitter is operating at a point conducive to high signal to noise ratios, and dynamically adapt itself to operate in a lower noise environment.

In one embodiment, a lookup table can be employed to speed the change in the frequency. In this case, the determination of where the operating point of the system is leads to one of the selections in the lookup table being used to obtain a clocking frequency of the loop filter.

FIG. 5 is another implementation of a transmitter using polar modulation technology. In this case, an amplitude modulating signal is concurrently applied to the amplifier 48 to produce a time-varying envelope for the amplified phase or frequency signal.

One should note that the apparatus may also be used in receivers, and is not limited to wireless communications. In fact, many aspects of this description may also be used in other communications devices. Further, the use of the varying clock control of a driver mechanism for a signal generator, such as the loop filter, based upon the relationships to the output and to the accompanying noise may be used in other more general circuits not related to the communications field.

Thus, an apparatus and method for dynamically clocking a loop filter in a communications device is shown and described. Those skilled in the art will recognize that many modifications and variations of the present invention are possible without departing from the invention. Of course, the various features depicted in each of the Figures and the accompanying text may be combined together. Accordingly, it should be clearly understood that the present invention is not intended to be limited by the particular features specifically described and illustrated in the drawings, but the concept of the present invention is to be measured by the scope of the appended claims. It should be understood that various changes, substitutions, and alterations could be made hereto without departing from the spirit and scope of the invention as described by the appended claims that follow.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

Accordingly, we claim:

1. A transmitter comprising:
   a signal generator having an input, the signal generator operable to produce a first signal at a first frequency and the first signal having an associated first frequency characteristic, the first signal containing frequency-related information, the first signal produced in accordance with a signal received at the input of the signal generator;
   an amplification stage, coupled to the signal generator, having an output and operable to receive the output of the signal generator, the output of the amplification stage being dependent on both the first signal and an incoming amplitude modulating signal;
   a detection circuit, coupled to the output of the signal generator, having an output and operable to detect the first frequency-related characteristic of the output of the signal generator and generate a signal representative of the first frequency-related characteristic;
   a comparison circuit, coupled to the detection circuit, having an output and operable to compare the signal representative of the first frequency-related characteristic and a signal representative of a second frequency-related characteristic, the output of the comparison circuit indicative of a difference between the first frequency-related characteristic and the second frequency-related characteristic;
   a loop filter, coupled to the comparison circuit and to the signal generator, operable to output a signal to the signal generator in response to the output of the comparison circuit, the loop filter operable to be clocked by an input clock at a second frequency;

a clock circuit, coupled to the comparison circuit and to the loop filter, for providing the input clock to the loop filter, the clock circuit operable to compare the first frequency and the second frequency; and wherein the clock circuit is operable to change the second frequency based upon a relationship between the first frequency and the second frequency.

2. A circuit producing an output signal based upon an input signal, the output signal having an output frequency and an associated output frequency characteristic, the output signal containing frequency-related and amplitude information, the output signal being output to an output port, the input signal received from an input port and representative of an expected output frequency characteristic, the circuit comprising:

a detection circuit for producing a first signal indicative of the output frequency characteristic;

a comparison circuit, coupled to the detection circuit and to the input port, for comparing the frequency characteristic as denoted by the first signal and the expected output frequency characteristic, the comparison circuit producing a second signal indicative of a difference between the output frequency characteristic and the expected output frequency characteristic;

a loop filter, coupled to the comparison circuit, for outputting a third signal in response to the second signal, the loop filter operated at least in part by a clock signal operating at a clock frequency;

a signal generator, coupled to the loop filter and to the detection circuit, for producing a signal having the output frequency characteristic in response to the third signal;

an amplification circuit, coupled to the signal generator and to an amplitude modulation circuit, for producing the output signal, the amplification circuit dependent on both the signal from the signal generator and the signal from the amplitude modulation circuit and, in response, outputting the output signal; and a clock circuit, coupled to the loop filter, for producing the clock signal, the clock circuit operable to dynamically change the clock frequency based upon a comparison of an integer multiple of the clock frequency and the output frequency.

3. A transmitter comprising:

an amplifier for producing a signal modulated with both an output amplitude characteristic and an output frequency characteristic; and a first circuit, coupled to the amplifier, for controlling the output frequency characteristic, the first circuit comprising:

a clock circuit;

a filter, coupled to the clock circuit and actuated by a clock signal from the clock circuit, the clock signal having a clock frequency; and a signal generator, coupled to the filter, for producing a signal having the output frequency characteristic;

wherein the clock frequency is dynamically determined based upon a frequency characteristic associated with the clock signal and the output frequency characteristic.

4. A method of controlling a transmitter, the transmitter having digital components controlling the generation of an output signal having an output frequency, the digital components being clocked at a first frequency, the first frequency derived from a base frequency and a first multiplier, the method comprising:

measuring the output frequency;

determining a second frequency such that the second frequency is an integer multiple of the first frequency;

determining if the second frequency is within a range about the output frequency;

based on the act of determining, selectively deriving a new first frequency by changing the first multiplier to a new multiplier, wherein an integer multiple of the new first frequency falls outside the range about the output frequency.

5. An apparatus for controlling a transmitter, the transmitter having digital components controlling the generation of an output signal having an output frequency, the digital components being clocked at a first frequency, the first frequency derived from a base frequency and a first multiplier, the apparatus comprising:

means for measuring the output frequency;

means for determining a second frequency such that the second frequency is an integer multiple of the first frequency;

means for determining if the second frequency lies within a range about the output frequency;

means for selectively changing the first frequency to a new first frequency by changing the first multiplier to a second multiplier, the means for selectively changing actuated by an output of the means for determining if the second frequency lies within a range, wherein an integer multiple of the new first frequency lies outside the range about the output frequency.

* * * * *